C. H. Sawyer.
Steering Apparatus.
No. 2948. Reissued May 26 1868.
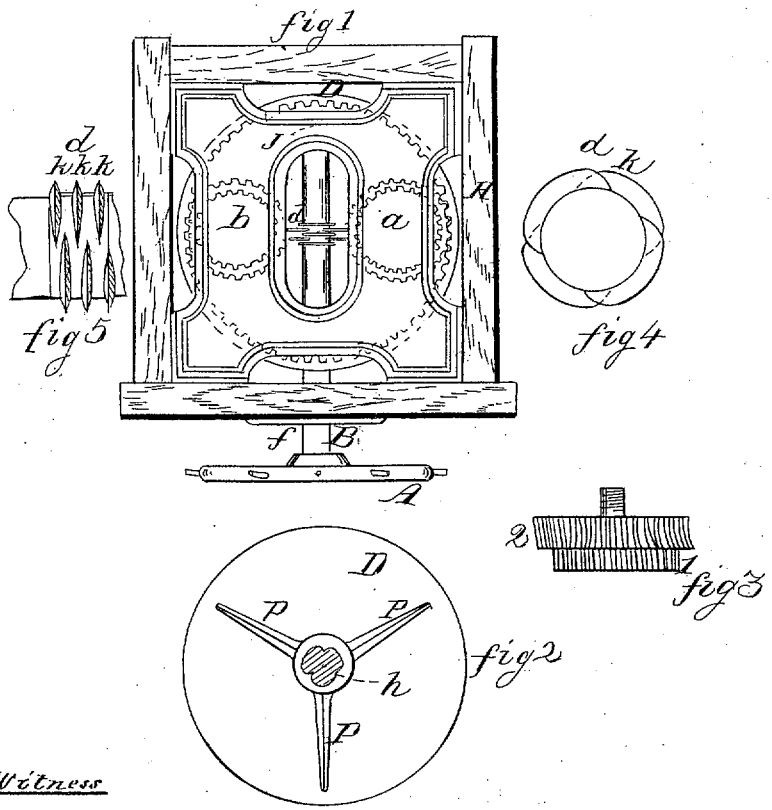
Witness
Henry C. Hoveton
Wm Frank Seavey
Inventor
Chas H Sawyer Per Attys
Wm H Phelps
N. PETERS, PHOTO-LITHOGRAPHER, WASHINGTON, D. C.

United States Patent Office.

CHARLES H. SAWYER, OF BUXTON, MAINE.

*Letters Patent No.* 76,105, *dated March* 31, 1868; *reissue No.* 2,948, *dated May* 26, 1868.

IMPROVEMENT IN STEERING-APPARATUS.

The Schedule referred to in these Letters Patent and making part of the same.

TO ALL WHOM IT MAY CONCERN:

Be it known that I, CHARLES H. SAWYER, of Buxton, in the county of York, and State of Maine, have invented a new and useful Improved Steering-Apparatus; and I hereby declare the following to be a full, clear, and exact description thereof, which will enable others to make and use my invention, reference being had to the accompanying drawings, forming part of this specification, in which—

Figure 1 is either a top view or side elevation.

Figure 2 is a bottom view of the revolving plate to hold the rudder-head.

Figure 3 is a side view of one of the small double gears.

Figure 4 is an end view of the wheel-shaft, showing the screw thereon.

Figure 5 is a side view of a portion of the shaft, with the right-and-left screw illustrated thereon.

The object of my invention is the production of an arrangement of mechanical devices for a power for steering vessels, or, in other words, to turn the rudders of vessels, for hoisting weights, and for other kindred purposes.

My invention consists of a shaft, with a right-and-left screw set upon said shaft, to operate two gears, placed on either side thereof, which gears, meshing into a larger gear on the inner periphery of a larger wheel or circle, thus give revolution to said larger wheel or circle, and with it the rudder of a ship, for instance, or a drum for the purpose of raising weights, and for other analogous purposes.

One peculiarity of my invention is that it is self-locking, or, in other language, that when the motive-shaft B is so turned as to move a rudder, or the plate or drum D, as desired, no force exerted upon the rudder, or the said plate or drum D, will reverse said motion, because the force thus applied will be transmitted through the smaller gears *a b* until it reaches the right-and-left screw *d*, when the pressure is simply in a horizontal or vertical direction upon the threads *k*, according as the machine is placed; and such force, it is evident, has no tendency to revolve the shaft B, since, when the shaft is so placed as to be a horizontal shaft, then the pressure of the gears *a b* is in a horizontal direction, and the shaft B revolves in a vertical plane or planes; and when the said shaft is a vertical shaft, then the pressure of *a b* upon threads *k* is a vertical pressure, and the shaft revolves in a horizontal plane or planes.

The drawings illustrate my invention in its application to steering vessels.

A shows a ship's wheel; B, the shaft; *a* and *b*, the smaller gears; *d* is the right-and-left screw on shaft B. This shaft is shown hung at *f*, at one end, and must also have a support or box, as at *g*, for the other end thereof. D is a larger gear, with the teeth on the inner periphery thereof, which said teeth match the part 1 of the smaller gears *a b*, (see fig. 3.) The reverse side or end of the wheel or drum D from that seen in fig. 1, is shown in fig. 2, where the hole *h* is represented to receive the rudder-post head. *p p* are ribs to strengthen D.

The part 2 of the smaller gears *a b* receives the right-and-left screw *d* on the shaft B. The device may be enclosed in the box or cover H.

It is plain that when the device is so turned as to make B a vertical shaft, then D is a horizontal wheel or drum, and *vice versa*. This is simply effected by the manner in which the machine is placed.

The operation is as follows:

By turning the wheel A and shaft B, the smaller gears *a b* are caused to revolve in the same direction, thus imparting motion to the large gear or wheel D, and with it the rudder of a vessel, or other object, as a drum. When once turned as desired, it is obvious, as before intimated, that no force applied at the object-end or side of the machine can reverse the motion of wheel A, unless so great as to break the gears either upon D, *a*, or *b*, or the threads on shaft B.

A cover or box will protect the gears from the weather.

What I claim as my invention, and desire to secure by Letters Patent, is—

The apparatus as herein described, having the wheel-shaft B, with its right-and-left screw *d*, the two small double gears *a b*, and larger gear D, with the teeth on the inner periphery thereof, substantially as and for the described purposes.

CHS. H. SAWYER.

Witnesses:

W. H. CLIFFORD,

WM. FRANK SEAVEY.